(12) United States Patent
Kaun

(10) Patent No.: US 8,313,853 B2
(45) Date of Patent: Nov. 20, 2012

(54) FLEXIBLE, POROUS CERAMIC COMPOSITE FILM

(76) Inventor: Thomas D. Kaun, New Lenox, IL (US)

( * ) Notice: Subject to any disclaimer, the term of this patent is extended or adjusted under 35 U.S.C. 154(b) by 928 days.

(21) Appl. No.: 12/315,210

(22) Filed: Dec. 1, 2008

(65) Prior Publication Data
US 2009/0181292 A1  Jul. 16, 2009

Related U.S. Application Data

(63) Continuation-in-part of application No. 10/455,087, filed on Jun. 5, 2003, now abandoned.

(60) Provisional application No. 60/386,859, filed on Jun. 6, 2002.

(51) Int. Cl.
H01M 2/14 (2006.01)
C04B 35/01 (2006.01)
C04B 35/58 (2006.01)
B32B 5/02 (2006.01)

(52) U.S. Cl. ..... 429/129; 429/112; 501/95.2; 428/293.4

(58) Field of Classification Search .................. 429/129, 429/112; 501/95.2; 428/293.4
See application file for complete search history.

(56) References Cited

U.S. PATENT DOCUMENTS

| 3,668,059 A |   | 6/1972 | Economy et al. |
|---|---|---|---|
| 3,915,742 A | * | 10/1975 | Battles et al. .................. 429/102 |
| 4,104,395 A |   | 8/1978 | Frankel |
| 4,284,610 A |   | 8/1981 | Hamilton |
| 4,354,986 A |   | 10/1982 | Maczuga et al. |
| 4,360,578 A | * | 11/1982 | McCoy ......................... 429/247 |
| 4,992,341 A |   | 2/1991 | Smith et al. |
| 5,714,283 A |   | 2/1998 | Briscoe et al. |

* cited by examiner

*Primary Examiner* — Gregg Cantelmo
(74) *Attorney, Agent, or Firm* — Cherskov Flaynik & Gurda, LLC

(57) ABSTRACT

A thin, flexible, porous ceramic composite (PCC) film useful as a separator for a molten-salt thermal battery comprises 50% to 95% by weight of electrically non-conductive ceramic fibers comprising a coating of magnesium oxide on the surface of the fibers in an amount in the range of 5% to 50% by weight. The ceramic fibers comprise $Al_2O_3$, $AlSiO_2$, BN, AlN, or a mixture of two or more of the foregoing; and the magnesium oxide coating interconnects the ceramic fibers providing a porous network of magnesium oxide-coated fibers having a porosity of not less than 50% by volume. The pores of the film optionally can include a solid electrolyte salt. A laminated electrode/PCC film combination is also provided, as well as a thermal battery cell comprising the PCC film as a separator.

13 Claims, 5 Drawing Sheets

FLEXIBLE, POROUS CERAMIC COMPOSITE FILM

CROSS-REFERENCE TO RELATED APPLICATIONS

This application is a continuation-in-part of U.S. Ser. No. 10/455,087, filed on Jun. 5, 2003, now abandoned, which claims the benefit of provisional application Ser. No. 60/386,859, filed on Jun. 6, 2002, the disclosures of which are incorporated herein by reference.

STATEMENT OF GOVERNMENTAL RIGHTS

This invention was developed with Navy SBIR funding under Contract no. Contract N00167-99-C-0071. The U.S. government has certain rights in this invention.

FIELD OF THE INVENTION

The present invention relates to porous ceramic composite films useful as thin separators in thermal batteries. More particularly, this invention relates to flexible, porous ceramic composite films comprising ceramic fibers having a magnesium oxide coating, and to articles and batteries including such thin films.

BACKGROUND OF THE INVENTION

Thermal batteries are the reserve power "of choice" on board many weapon and defense systems, due to their very long shelf life (about 25 years). The thermal batteries are kept in an essentially frozen state, until activated by heating. Within milliseconds of being heated to operating temperature, thermal batteries can produce very high pulse power outputs. Power generated by such batteries is utilized for guidance, communication, and arming of weapon and defense systems. Accordingly, thermal batteries play a critical role in our national defense.

Fiber mats of boron nitride (BN) suitable for use as separators in lithium-sulfide thermal batteries have been described by Hamilton, U.S. Pat. No. 4,284,610 and Maczuga, U.S. Pat. No. 4,354,986. The production of BN fibers is described by Economy, U.S. Pat. No. 3,668,059. BN separators exhibit structural stability (compressive strength), small interstices (useful as a particle barrier), and can hold a large volume fraction (65-85%) of a molten halide electrolyte. Because of its unacceptable high production cost (e.g., due to difficult, high temperature fabrication), and difficulty in initiating wetting with molten halide, the use of BN as a separator has been abandoned in favor of high-surface area MgO powder-based separators. Pressed-powder MgO separators are relatively inexpensive, have chemical stability, and can immobilize 65-85 volume % of electrolyte within the interstices of the pressed powder. A significant drawback of MgO separators is the limited structural stability of the material, which results in undesirable limits on thinness of the separator that can be obtained with this material. A MgO powder separator when combined with molten electrolyte, is a paste at thermal cell operating temperatures.

Attempts to prepare MgO fibers have resulted in highly frangible products, which are reduced to particles under compressive loads. U.S. Pat. No. 4,104,395 to Frankle teaches that impregnation of organic fibers with precursor materials can form mineral fibers after high temperature processing (e.g., 1400° C.). Smith et al. (U.S. Pat. No. 4,992,341) teach production of fiber-like sheets of MgO, by layering a sheet of MgO powder in threads in a combustible binder, and then sintering the layered material to decompose the binder and form a fiber-like MgO sheet structure.

Due its frangible nature, formation of a porous MgO structure with sufficient compressive strength for use in thermal batteries is limited to materials having only about a 50% open volume fraction available for receiving a working fluid, such as a molten halide electrolyte. For example, Briscoe et al. U.S. Pat. No. 5,714,283 describe formation of MgO structure by sintering a MgO precursor (e.g., a soluble magnesium salt of an organic acid) on a microporous sintered metal screen support. The resulting sintered MgO films, having a thickness of about 3-25 mils, but have only about 20-50% open volume for incorporation of an electrolyte. The low open volume of such materials imposes performance limitations in thermal battery applications, especially if there is structural disintegration (e.g., due to mechanical stressed during manufacture, etc.).

In thermal battery technology, the trend has been toward development of higher power density. The design approach for this has typically involved producing thinner cells. Thermal batteries are produced from stacked cells consisting of pressed powder wafers in the following repeating order: (a) a heat pellet, (b) a Li-alloy negative electrode (anode), (c) a porous separator (e.g., MgO) containing a meltable electrolyte salt, and (d) a $FeS_2$ positive electrode (cathode). Each wafer typically is about 1 mm (about 39 mils) thick. Battery performance could be improved by using a thinner separator, if suitable materials were available. Thinner MgO separators are impractical due to the physical strength limitations inherent in the MgO pressed-powder materials.

The separator component of a thermal battery physically separates and ionically couples the anode and the cathode in each cell of the battery. Ideally, a separator should have a relatively high capacity for an electrolyte and have connected porosity for high performance. Added characteristics of importance include dimensional stability and flexibility. In one application, wafer thin separator components limit battery pulse power to about 5.5 kW. A thinner separator would boost the proportion of active materials (electrolyte) in the battery, and thus boost power output. Unfortunately, MgO powder wafers have limited handling strength, and generally must be at least about 1 mm in thickness for practical use in thermal batteries. Thinner MgO tends to crack or break, thus compromising the integrity of the entire battery. Larger diameter wafers exacerbate the handling problems. Because of this, MgO powder wafers must have a substantial thickness to be of practical use. In addition, volumetric changes of the active electrolyte material tends to distort the electrolyte/separator interface, which leads to cell shorting.

The prevailing construction and chemistry of a state-of-the-art thermal battery has been around for about 25 years. It uses Li-alloy and metal sulfide electrodes, with a lithium halide salt as the electrolyte. The salt becomes molten upon heating. As noted above, the battery is composed of a stack of wafers of pelletized powders. Wafer fabrication and battery assembly involve substantial hand labor, partly due to the frangible nature of MgO separators. The wafer pressing operation has received some automation, but battery assembly relies on hand stacking of components.

Current thermal battery manufacturing employs uniaxial powder pressing technology to form active cell components. The thickness, diameter, and overall geometry (parts are typically cylindrical) of the wafers are limited by the uniaxial powder pressing process. The thickness obtainable for uniaxially pressed wafers for thermal batteries ranges from approximately 1 mm to about 10 mm. Production of thinner or thicker parts is notably more difficult, and commonly results in low yields, and therefore, higher costs. Thinner wafers require precise, even die loading, while thicker wafers require the use of organic binders to distribute the applied pressure evenly. Similarly, large diameter wafers are difficult to uniaxially press due to increasingly larger processing equipment required to provide the necessary mechanical loads to form the wafers—typically greater than about 10,000 pounds-per-square inch (psi). These limitations preclude many advanced battery designs.

For electrode pellet manufacture, a high tonnage press typically is required to achieve 50 volume % active electrode material loading. A portion of the electrolyte salt generally is combined with the electrode material to aid in the formation of suitable cold-pressed pellets. The metal sulfide electrode material, $FeS_2$, is a very hard material and does not compact well on its own. Typically, the pressed electrode uses $FeS_2$ coated with electrolyte salt to facilitate the powder compaction. The resulting cold-pressed pellet generally comprises about 50 volume % $FeS_2$, about 30 volume % electrolyte salt, and a void volume of about 20 volume %. An unpressed powder layer would typically have a void volume of about 50 volume %. To achieve the desired 50 volume % active material loading, the high tonnage press must displace about 30% of the void volume that is needed for the electrolyte salt. This is crucial, in that unpressed electrodes with a 20-30 volume % loading of electrolyte exhibit poor performance (e.g., low energy density and low power output).

The separator material used in previous molten salt thermal batteries is pressed from a high-surface area MgO powder. MAGLITE® S or MAGLITE® D (Calgon), and more recently MARINCO® OL (Marine Magnesium Company) magnesium oxide mixed with electrolyte salt, have been the materials of choice for pressed powder separators. Alternative materials have been investigated, but only the pressed-powder MgO/salt separator has found commercial application.

SUMMARY OF THE INVENTION

The present invention provides a flexible, porous ceramic composite film suitable for use in a thermal battery, in which the film comprises 50% to 95% by weight of electrically non-conductive ceramic fibers comprising a coating of magnesium oxide on the surface of the fibers in an amount in the range of 5% to 50% by weight. The ceramic fibers can comprise $Al_2O_3$, $AlSiO_2$, BN, AlN, or a mixture of two or more of the foregoing, preferably $Al_2O_3$, $AlSiO_2$, or a combination thereof (e.g., 50% to 95% by weight $Al_2O_3$ and 5% to 50% by weight $AlSiO_2$). In a particularly preferred film, the ceramic fibers comprise 56% by weight $Al_2O_3$ and 19% by weight $AlSiO_2$ and the magnesium oxide coating is present at 25% by weight. The magnesium oxide coating interconnects the ceramic fibers providing a porous network of magnesium oxide-coated fibers having a porosity of not less than 50% by volume (preferably 70 to 95%). Preferably, the ceramic fibers are up to 10 microns in diameter and 1 mm in length. In some preferred embodiments the film has a thickness of less than 12 mils (0.3 mm), e.g., 5 to 10 mils (about 0.13 to 0.26 mm). Preferably, the film includes pores up to 5 microns in average diameter. Advantageously, the porous ceramic composite (PCC) films of the present invention are manufactured without the use of a high-pressure hydraulic press, and can be prepared in precursor sheets that can be readily cut to any desired shape or size up to 250 mm diameter. The PCC films also exhibit surprising flexibility and handling strength.

In another aspect, the present invention provides a flexible composite film suitable for use in a thermal battery comprising 50% to 95% by weight of electrically non-conductive ceramic fibers coated with magnesium oxide (e.g., in an amount in the range of 5% to 50% by weight), wherein the magnesium oxide coating interconnects the ceramic fibers providing a porous network of magnesium oxide-coated fibers having a porosity of not less than 50% by volume, and the pores of the network contain a solid electrolyte salt (e.g., an alkali metal halide, an alkali metal nitrate, an alkali metal nitrite, and the like) in an amount of up to 95% by volume based on pore volume of the network. The ceramic fibers can be $Al_2O_3$, $AlSiO_2$, BN, AlN, or a mixture of two or more of the foregoing (preferably comprise $Al_2O_3$, $AlSiO_2$, or a combination thereof). The electrolyte salt preferably comprises a lithium halide salt (e.g., a mixture of LiCl, LiBr, and KBr). As used herein and in the appended claims, the term "solid electrolyte salt" and grammatical variations thereof refers to an electrolyte salt that is solid at room temperature and molten at thermal battery operating temperatures.

In another aspect, the present invention provides a laminated electrode and porous separator film combination suitable for use in thermal batteries. The combination includes a solid electrolyte salt within a PCC film of the invention as a separator, and layer of powdered cathode material adhering to a surface of the PCC film with additional electrolyte therebetween to bind the cathode and the separator. The PCC film comprises 50% to 95% by weight of electrically non-conductive ceramic fibers having a coating of magnesium oxide on the surface of the fibers in an amount in the range of 5% to 50% by weight. The ceramic fibers can be $Al_2O_3$, $AlSiO_2$, BN, AlN, or a mixture of two or more of the foregoing. As in the other aspects of the invention, the magnesium oxide coating interconnects the ceramic fibers providing a porous network of magnesium oxide-coated fibers having a porosity of not less than 50% by volume (typically 70 to 95 volume %). In this aspect, the pores of the network contain a solid electrolyte salt, such as an alkali metal halide, nitrate or nitrite salt, in an amount of up to 95% by volume based on the pore volume of the network. The cathode material can include one or more compound of Fe, Co, Cu, or Ni. Preferably, the separator film contains fibers of $Al_2O_3$, is less than 12 mils (0.3 mm) thick, and includes an electrolyte containing LiCl present in an amount in the range of 80% to 95% by volume of the porous film.

Another aspect of the present invention is a thermal battery cell comprising a lithium-containing anode material and a powdered cathode material separated by a flexible, porous composite film of the present invention, as described herein. Preferably, the battery comprises a plurality of the cells connected in series or parallel.

In yet another aspect, the present invention provides a method of making flexible, porous ceramic composite film, comprising the steps of (a) depositing a mat of ceramic fibers onto a substrate from a suspension of the ceramic fibers; (b) introducing a soluble magnesium salt into the mat of ceramic fibers; (c) drying the mat and magnesium salt to form a dried, paper-like film; (d) and heating the dried film, preferably in an oxygen-containing atmosphere (e.g. in air), at a temperature and for a time sufficient to convert the magnesium salt to a coating of magnesium oxide on the fibers. The MgO interconnects the ceramic fibers to form a porous network having a porosity not less than 50% by volume. The PCC films are flexible and have surprising and exceptional handling strength suitable for thermal battery use, at thicknesses in the range of about 3 to 12 mils (0.077 to 0.3 mm), which is significantly thinner than the practical limit for MgO pressed-powder films typically used as thermal battery separator components. The mat of fibers can be deposited onto a mesh screen or can be cast onto a substrate, such as a polyethylene terephthalate (PET) film substrate.

In one aspect, this invention relates to the design and manufacture of thermal batteries using a thin PCC film as a substitute to the conventional pressed MgO powder separator, which can be produced at a thickness of about 3 to 12 mils while still maintaining a surprisingly high degree of strength and flexibility. The thinner PCC film results in a significantly higher power (higher voltage and current) when used as a separator in a thermal battery, allowing a greater portion of the battery height to be utilized for increasing the number of cells (and thus voltage) in a battery of a given size. In addition, the thinner separator results in less battery of the battery volume and thermal mass being inactive (i.e., non-electrolyte or electrode material), resulting in significantly higher battery energy per unit volume. Pulse power may increase by 50% using the PCC films of the invention as the separator component. Higher power density is a dominant theme in thermal battery development today. In one application, the PCC film may increase battery pulse power from 5.5 kW to about 8 kW.

The PCC films of the invention, when used as a separator for a thermal battery, have unique chemical stability to Li activity and wetability to molten halide electrolytes. In addition, the PCC films have excellent handling characteristics (flexure strength) and durability in molten salt. Thin PCC films withstands distortion from the volume changes during cell discharge much better than conventional pressed-powder MgO separators. Additionally, PCC films provide a foundation for a new, more-economic method of manufacturing thermal batteries. The structural stability of PCC films in molten salt permit the electrode material to be applied to the film in a continuous process, producing a laminate of electrode and separator. The ability to utilize larger diameter separators, due to the flexibility and strength of the PCC films, enables new designs for high power thermal batteries. The ability of PCC films of the invention to increase battery power and energy density has been demonstrated.

In some preferred embodiments, the ceramic fibers are present in the PCC film at a concentration in the range of about 70% to about 90% by weight, with the MgO coating being present in the range of about 10% to about 30% by weight.

Advantageously, the PCC films of the present invention allow for an improved, continuous manufacturing method for producing thermal battery cells in which a handleable electrode of 40-60% active material is produced without the use of a high tonnage hydraulic press. A thermal process integrates a PCC film separator with a bed of electrode material particles (e.g., iron sulfide) to produce a separator/electrode combination. The PCC film separator enables molten electrolyte to infiltrate the film and the metal sulfide electrode particle-bed to form, upon cooling, a unitary laminated structure having an electrode layer and a separator layer bound together with the electrolyte and affording a desirable electrolyte density of 50 volume % in the electrode layer. The structural integrity of the PCC film provides support for the structure, and as the electrolyte salt melts, the porosity of the PCC film regulates the flow of the salt over to the electrode powder bed to keep the electrode material from fluidizing, which is undesirable.

The PCC films of the invention have exceptionally high porosity (typically 70 to 90 vol. %) compared to conventional MgO-type separator materials commonly used in thermal batteries, yet surprisingly, even films as thin as 3 mils in thickness retain paper-like structural integrity and flexibility. These superior handling characteristics make the PCC films of the invention particularly useful in thermal battery applications where very thin films are desirable, but expensive due to the typically friable nature of conventional separators. In addition, the PCC films of the invention can be utilized in other applications where porous films are useful, such as in liquid filtration or as a porous support for various chemical processes, for example as a catalyst support.

Additional advantages, objects and novel feature of the invention will become apparent to those skilled in the art upon examination of the following and by practice of the invention.

DETAILED DESCRIPTION OF THE INVENTION

Figure 1:
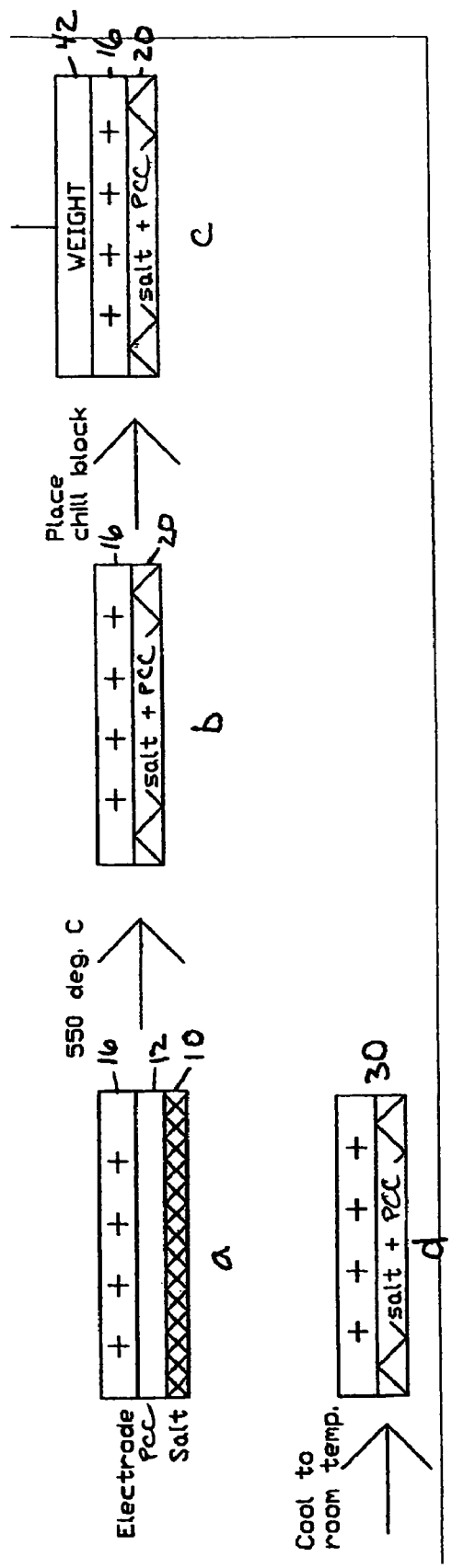
FIG. 1 depicts in cross-section, the process for making a laminate of a porous ceramic composite (PCC) film along with a pressed-powder $FeS_2$/electrolyte electrode.

This invention relates to ceramic articles and methods of making same, which are electric insulators useful for a variety of purposes. However, for illustration purposes, the invention will be described in connection with its use as a separator in a thermal battery. A preferred PCC film separator consists of about 10/90 to about 30/70 weight ratio of ceramic fiber/MgO coating. Fiber diameter preferably is about 10 microns and fiber length preferably is about 1000 microns. A PCC film of the invention comprises or consists of resilient ceramic fibers coated with magnesium oxide and formed into a film of about 3 to 12 mil thickness. The PCC film can accommodate a loading of at least 85 volume % of electrolyte to impart high ionic conductivity. A particularly preferred separator PCC film composition is 56% $Al_2O_3$ fiber, 19% $AlSiO_2$ fiber, 25% MgO coating, by weight. An example of useful fiber blend is 75/25 weight % $Al_2O_3$/$AlSiO_2$. Fiber sources include ALTRA® $Al_2O_3$ from Rath (Wilmington, Del.) and FIBERFRAX® $AlSiO_2$ from Carborundum.

The MgO coating material is formed on the ceramic fibers in situ by thermal decomposition of the soluble magnesium salt (e.g., a magnesium salt of a carboxylic acid, such as magnesium acetate; magnesium carbonate; and the like). The magnesium salt coats the fibers and then is converted to magnesium oxide, which also binds the ceramic fibers together for flexibility and strength, while leaving an open porous structure with greater than 50 volume % of void space in the film. The PCC films of the invention are particularly useful as separators in thermal batteries, since the films possess durability and flexibility far beyond that of conventional MgO pressed-powder separators.

Preferably, the MgO coating contributes about 30% by weight of the film. Examples of additional useful fibers include boron nitride (BN) and aluminum nitride (AlN). $SiO_2$ or ceramic/glasses with higher levels of $SiO_2$ have been found to be of insufficient chemical stability for the high Li-activity Li-alloy electrodes that are generally used in thermal batteries. The use of a precursor that decomposes into a MgO coating in the methods of the present invention further enhances the chemical stability of the resulting film e.g., when used as a separator in a thermal battery. Magnesium acetate is a particularly useful MgO precursor, although any other thermally decomposable magnesium salt (e.g., other magnesium carboxylic acid salts, magnesium carbonate, and the like), which are well known in the art will suffice.

In a preferred method embodiment, the ceramic fibers are "dropped" onto a fine mesh (e.g., a polyester mesh) at a laydown of about 3 $mg/cm^2$ to provide an approximately 130 micron thick layer, a series drying and infiltration steps coat the fibers with and connect the interstices of the fiber mat with magnesium oxide. As used herein, the term "dropping" and grammatical variations thereof, refers to a technique used in papermaking in which fibers are collected on a fine screen by filtration of an aqueous suspension of fiber. A solution of a soluble magnesium salt (e.g., magnesium acetate) is applied to the fiber mat (e.g., as a 0.6 $g/cm^3$ aqueous solution). Magnesium carbonate and magnesium hydroxide are two other non-limiting examples of soluble magnesium salts that could be substituted for magnesium acetate. Optionally, a liquid drying agent, such as isopropyl alcohol or the like, can be applied to the mat after the magnesium salt to aid in wetting ceramic fibers and to enhance the drying. Drying preferably is performed in a flowing stream of air at about 75 to about 100° C. After drying for about 2 hours, the resulting ceramic fiber "paper" can be peeled from the fine mesh. A combustible carrier can be used to facilitate the peeling step, if desired. The ceramic fiber paper is sufficiently rigid for good cutting, e.g., with a die punch, yet it can be handled and has sufficient flexure strength that it doesn't easily crack and break apart.

Ceramic fiber paper as thin as 100 microns can be handled in sheets as large as 250 mm diameter without significant breakage. The process is completed by heating the ceramic fiber paper to a temperature sufficient to convert the magnesium salt to MgO (e.g., about 600 to 650° C.). An exemplary method of preparing a PCC film of the invention has the following steps: (a) blending and dispersing fibers with water (e.g., in an impeller); (b) introducing the fiber suspension onto a fine mesh (e.g., polyester vale); (c) removing water (e.g., by filtration or by simple drainage); (d) drip drying the resulting fiber mat; (e) introducing an aqueous magnesium salt solution into the fiber mat to infiltrate the fiber mat with magnesium salt; (f) drying the infiltrated mat in flowing hot air; (g) preferably repeating the infiltration steps (e) and (f) at least once; (h) peeling the resulting fiber paper from the fine mesh; (i) cutting the paper to a desired size; and (j) heating the cut paper at about 600-650° C. in air for about 3 to 6 hours to convert the magnesium salt to MgO.

Non-limiting examples of other methods useful for forming ceramic fibers into a mat for use in producing PCC films of this invention include:

1. pulling fibers from a fluidized bath containing ceramic fibers onto a belt (e.g. fine mesh screen or combustible carrier) e.g., using a vacuum roller;
2. spraying an aqueous suspension of ceramic fibers onto a belt (e.g. fine mesh screen or combustible carrier);
3. slip casting a suspension of ceramic fibers in gelatinous medium onto a belt or other substrate (e.g. fine mesh screen, a film, or combustible carrier); and
4. blowing an air dispersion of ceramic fibers onto a belt (e.g. fine mesh screen or combustible screen).

Slip casting a slurry or suspension onto a substrate such as a PET film is a preferred method for preparing a fiber mat.

The present invention provides flexible PCC films at about 3 to 12 mil thickness, which is a significant improvement over the present thinnest limits of 25 mil for cell pressed wafers at 10 mm diameter or larger. Because they are also supplied in the form of flexible sheets, the flexible, porous ceramic composite films of the invention offer cost saving options for thermal battery manufacture. The cost of conventional thin-cell thermal batteries is inflated by the poor handling characteristics of the wafer-thin components. A thirty percent parts-loss rate is presently typical. Even at the conventional thicknesses, the thermal batteries can benefit from using the PCC films of the present invention as the separator component. The fragility of conventional wafer pellets has required expensive hand assembly. The durability of the films of this invention (e.g., the bendable nature of the films and the ability to pass a "drop" test) permits automated, faster assembly. Reduction of human error from the assembly process improves quality control, thereby further increasing the profitability for thin-cell thermal batteries. In addition, the PCC films of the invention can be readily wetted with molten electrolyte salts (e.g., alkali metal halide), exhibit good bending strength, flexibility, small pore-size, low density, and tortuosity, which are highly desirable features or properties for an improved separator in thin-cell, high-power thermal batteries.

Cell Fabrication with Porous Ceramic Fiber Films.

The structural stability of PCC films in the presence of molten electrolyte salt provides the basis for a significantly improved method for thermal cell manufacture. In this method of thermal battery manufacture, the PCC film acts as a buffer to regulate the amount of molten electrolyte that is applied to a metal-sulfide, particle-bed electrode. Use of too much electrolyte undesirably tends to fluidize the particle bed, thus destroying the packing-density and the physical dimensioning of the wafer-thin electrode. The PCC film of the invention can be used in at least three variations of thermal battery cell manufacture, which results provide a PCC film/metal-sulfide electrode laminate. The laminate significantly enhances the handling strength of a separator/electrode combination, and also helps to ensure proper components mating and flatness for stacking the cells. Typically, the form of the metal sulfide electrode will dictate the fabrication procedure to be used.

A conventional metal-sulfide electrode typically is a pressed-powder bed of metal sulfides and an electrolyte salt. The process enables the electrolyte to infiltrate the metal sulfide particle-bed matrices and retain the initial desired particle-bed density of 50 volume %. In the prior art, production of metal sulfide electrode pellets with particle-bed density that approached 50 volume % required high-tonnage hydraulic presses. The salt component of the pellet was compacted between the metal sulfide particles by the elimination of void volume. The present invention infiltrates molten salt in a controlled fashion into a particle-bed, and can achieve the same particle-bed density, 50 volume %, without the high-tonnage hydraulic presses. Alternatively, a simple metal sulfide particle bed contained within a cup, or a typecast layer of metal sulfide particles in an expendable binder matrix can be used to form the electrode, in which case an electrolyte is not needed to form the laminate.

The cross-sectional views in FIGS. 1(a)-(d) depict the process for making a laminate of a PCC film and a pressed-powder $FeS_2$ electrode bound together by an electrolyte salt. The laminated component 30 enables a thin, large-diameter separator and cathode combination to be assembled into a thermal battery. In FIG. 1a, the first step involves placing an electrolyte powder 10 onto a conveyor that passes through a tunnel furnace, in an amount necessary to infiltrate the a PCC film. The electrolyte powder can be dispensed by a shoe (a powder filled hopper) traveling over a cavity (not shown), or as a die-punched piece of tapecasted electrolyte powder. A PCC film 12 is placed onto electrolyte powder 10. In turn, a pressed-powder $FeS_2$/electrolyte electrode 16 is placed onto the PCC film 12. The stacked components then travel through the tunnel furnace at about 550° C. for about 2 minutes. As shown in FIG. 1b, the electrolyte powder 10 melts and infiltrates into PCC film 12 to form a PCC film/electrolyte salt combination 20. The pressed-powder $FeS_2$/electrolyte electrode 16 remains on top. The stacked components then travel out of the tunnel furnace, and onto a chilling block 42 (e.g., a copper block) as shown in FIG. 1c. After cooling to room temperature on block 42 over about 2 minutes, the resulting laminated PCC film/cathode 30 emerges, as shown in FIG. 1d. The solidified electrolyte salt binds the PCC film and electrode layers for superior handling. The laminated PCC film/cathode 30 is immediately available for assembly of a thermal battery (e.g., by stacking with an anode, a heat pellet and a current-collector sheet).

The cross-sectional view of FIGS. 2a-f depict the process for making a laminate of a PCC film along with a $FeS_2$ powder bed (i.e., eliminating the use of hydraulic pressing for producing the electrode). The laminated component 30 enables thin, large diameter separator and cathode combinations to be assembled into a thermal battery. As shown in FIG. 2a, the process uses a conveyor belt 50 that consists of plates with shallow cups. In FIG. 2b, the first step involves placing an amount of metal sulfide powder 8 onto a conveyor that moves through a tunnel furnace. The powder can be dispensed by a shoe (a powder filled hopper) traveling over a cavity (not shown) or as a die punched piece of tapecasted electrode powder. In FIG. 2c, a PCC film 12 is placed onto the electrode powder 8. In turn, FIG. 2d illustrates placing an electrolyte powder 10 onto the PCC film 12. The amount of electrolyte powder 10 placed onto the PCC film 12 is just enough to infiltrate both the PCC film 12 and the $FeS_2$ powder bed 8. Again, the electrolyte powder can be dispensed by a shoe (a powder filled hopper) traveling over a cavity (not shown) or as a die punched piece of tapecasted electrolyte powder. The stacked components are then conveyed through the tunnel furnace at about 550° C. for about 2 minutes. Batch processing in a vacuum oven (e.g., at about 550° C.) can also be used to melt the electrolyte. As shown in FIG. 2e, the electrolyte powder 10 melts and infiltrates into PCC film (forming electrolyte filled film 20) and the $FeS_2$ cathode 16. The resulting combination 30 of PCC film and electrode, bound by electrolyte, is then conveyed out of the tunnel furnace, where after cooling to room temperature over about 2 minutes the laminated PCC film/cathode combination 30 is ejected (see FIG. 2f) by part-ejector 40 (a push plate) that is at the bottom of each cup on the conveyor.

The solidified electrolyte salt along with the high modulus of rupture (MOR) of the PCC film of the invention, unitizes the separator (PCC film) and electrode layers for superior handling. The laminated PCC film/cathode combination 30 is immediately available for assembly of a thermal battery, as described above.

Examples of preferred fibers for use in the PCC films of the invention generally have a diameter of about 10 μm (micrometers) and a length of about 1 mm. Ceramic fibers are generally manufactured to a nominal fiber diameter of between 3-4 μm, although a typical range of actual diameters is 0.2-8.0 μm.

The following examples are provided to illustrate certain aspects of the present invention and are not to be interpreted as limiting the invention in any way.

EXAMPLE 1

Production of a PCC Film

A PCC film is prepared by using a blender to suspend 3.0 grams of ceramic fiber (composition of 75/25 weight % $Al_2O_3$/$AlSiO_2$ comprising SAFFIL® $Al_2O_3$ fibers from ICI, and FIBERFRAX® $AlSiO_2$ from Carborundum) in 0.5 liters water. The fiber then is dispersed in 8 liters of water in a papermaking machine and dropped onto a 250 mm diameter fine polyester mesh at a 6 mg/cm$^2$ loading to provide a 250 micron thick fiber mat layer, which is then drip dried. The mat then is infiltrated at with magnesium acetate (applied as a 0.6 g/mL aqueous solution containing 5 volume % isopropanol) and dried. The infiltration and dying is repeated at least once to provide a ceramic fiber paper. Addition of isopropanol aids in wetting the ceramic fibers and enhances the drying rate. Drying is done in flowing air at about 75-100° C. After drying about 2 hours, the resulting ceramic fiber paper can be peeled from the fine polyester mesh. The pieces of ceramic fiber paper are cut to a desired size using an EXACTO® knife and a precision form, such as a 2.05 inch diameter form. The cut paper next is processed at 600-650° C. in air for 3-6 hours to convert the magnesium acetate to MgO, forming a porous ceramic composite film of the invention. The film has a 70/30 weight ratio of $Al_2O_3$ fiber-to-$AlSiO_2$ fiber.

Electrolyte is infiltrated into the PCC film by placing a weighed amount of electrolyte powder onto the PCC film, and placing it onto a 500° C. hot plate just long enough to melt the electrolyte. The electrolyte-infiltrated piece is then placed onto chill-block (e.g. a Mo plate) and cooled under a weight to solidify the electrolyte. This electrolyte-filled PCC film can be used as a separator in a thermal battery cell by stacking pressed-pellets of a Li—Si alloy/electrolyte wafer and a $CoS_2$/electrolyte wafer on either side of the PCC film to form a test cell.

An important specification related to the handling strength of separators for thermal batteries is the modulus of rupture (MOR) or bending strength before breaking. As the separator is thinned, it becomes easier to break. A three-point break apparatus is used to evaluate MOR. The MOR is determined by incrementally-loading the three-point fixture (usually three rods in parallel) until the specimen snaps. Separator MOR values are determined from a group of repeated tests. The MOR is normalized for varying cross-section.

Figure 3:
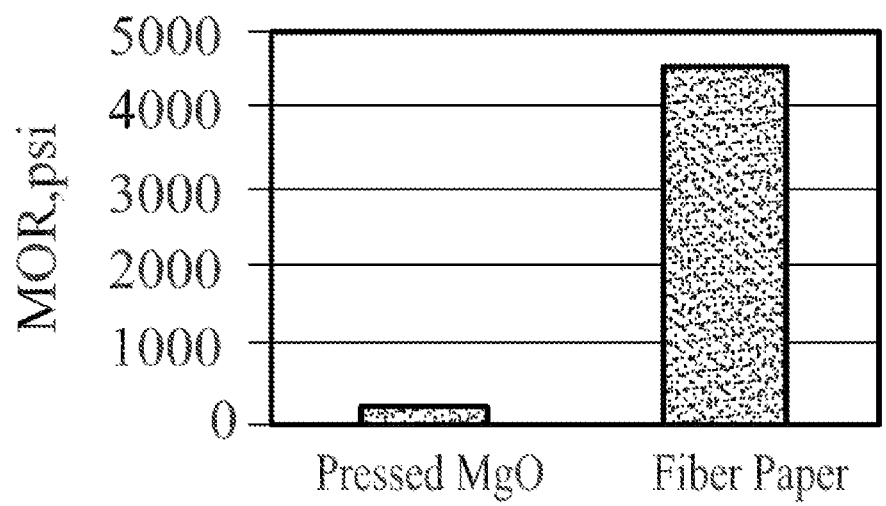
FIG. 3 is a graph of the modulus of rupture in pounds-per-square inch (psi) for a PCC film/electrolyte compared to a standard MgO/electrolyte pressed-pellet-type material.

The PCC film surprisingly has an MOR of 2,000 up to 4,500 compared to only about 100 for the conventional pressed-powder MgO/electrolyte salt pellet (i.e., the PCC film has at least 20 times greater than that of the MgO powder separator), as illustrated in FIG. 3, and this is what is meant by use of the term "flexible" regarding the PCC films of the present invention. Since the bending moment increases for a larger diameter separator, the MOR becomes more critical for larger diameter cells. The PCC films of the invention surprisingly have the same handling strength as a standard pressed-powder MgO separator at only 5% the thickness of the MgO separator. It is therefore understandable that the CFS at 50% thickness of the MgO separator thickness has superior handling strength. Thus, the PCC film, at 50% thickness of a standard MgO separator, exhibits far superior handling strength, and also fulfills the targeted power density of the emerging thermal battery market.

Additionally, the PCC films of this invention, when used as separators in a thermal battery cell, have the chemical and physical properties necessary to meet the goal of high current density at high power for future thermal battery applications (i.e., 85-95% open volume for high electrolyte content, and the chemical stability to provide resistance to Li corrosion). Unlike pressed-powder MgO separators, full-size 3.66 inch diameter PCC film separators pass the "drop test", and display surprising physical flexibility even after electrolyte filling. The PCC films of the invention can reduce cell thickness and weight, allowing for approximately 15% more cells per unit of height for a thermal battery utilizing PCC film separators compared to a battery using pressed-powder MgO separators.

EXAMPLE 2

PCC Film Laminated with Pressed Electrode Pellet

A PCC film is prepared by using a blender to suspend 1.5 grams of ceramic fiber (composition of 75/25 weight % $Al_2O_3/AlSiO_2$ comprising ALTRA® $Al_2O_3$ fibers from Rath, Wilmington, Del., and Z-90 SAZ® P-15 $AlSiO_2$ from K Industries, Livonia, Mich.) in 0.5 liters water. The fiber then is dispersed in 8 liters of water in a papermaking machine and dropped onto a 250 mm diameter fine polyester mesh at a 6 mg/cm$^2$ loading to provide a 250 micron thick fiber mat layer, which is then drip dried. The mat then is infiltrated with magnesium acetate (applied as a 0.6 g/mL aqueous solution containing 5 volume % isopropanol) and dried. The infiltration and drying is repeated at least once to provide a ceramic fiber paper. Addition of 5 volume % isopropanol aids in wetting the ceramic fibers and enhances the drying rate. Drying is done in flowing air at about 75-100° C. After drying about 2 hours, the resulting ceramic fiber paper can be peeled from the fine polyester mesh. The pieces of ceramic fiber paper are cut to a desired size using an EXACTO® knife and a precision form, such as a 2.05 inch diameter form. The cut paper next is processed at 600-650° C. in air for 3-6 hours to convert the magnesium acetate to MgO, forming a porous ceramic composite film of the invention having a 70/30 weight ratio of ceramic fiber to MgO. The PCC film has a thickness of less than about 12 mils (generally 5-10, preferably 4-6 mils), and has far superior handling characteristics compared to a conventional MgO separator. A cut piece of the PCC film is then stacked with a $CoS_2$/electrolyte pressed-pellet electrode, as shown in FIG. 1.

Electrolyte is infiltrated into the PCC film by placing 1.28 grams of electrolyte powder (an equimolar (i.e., 1:1:1 molar) blend of LiCl, LiBr, and KBr) onto the PCC film, and placing PCC film/electrode stack onto a 500° C. hot plate just long enough to melt the electrolyte into the PCC film. The electrolyte-infiltrated PCC film/electrode combination is then placed onto chill-block (e.g. a Mo plate) and cooled under a weight to solidify the electrolyte, laminate the PCC film to the electrode via the solidified electrolyte. The resulting electrolyte-to-separator weight ratio is about 87:13. This electrolyte-filled PCC film/$CoS_2$ electrode is then stacked with a Li—Si alloy/electrolyte pressed pellet wafer to form a test cell.

Figure 4:
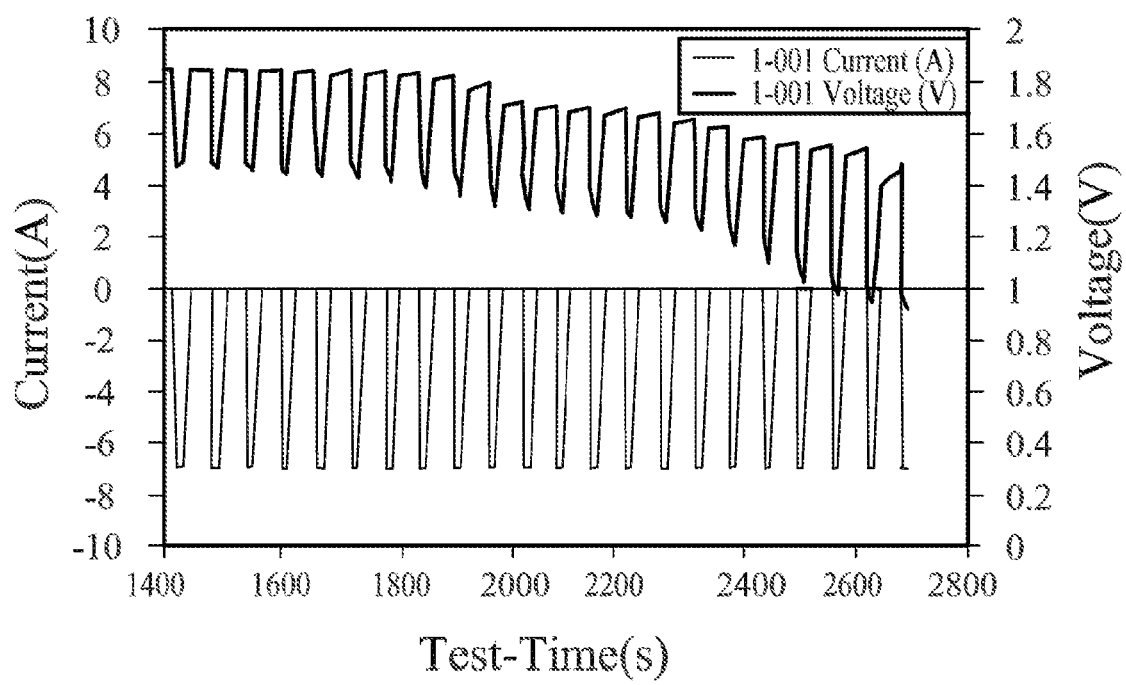
FIG. 4 is a cell voltage/time plot of a Li—Si alloy/$CoS_2$ cell including a PCC film separator with 10 sec pulses at 0.9 $A/cm^2$.
Figure 5:
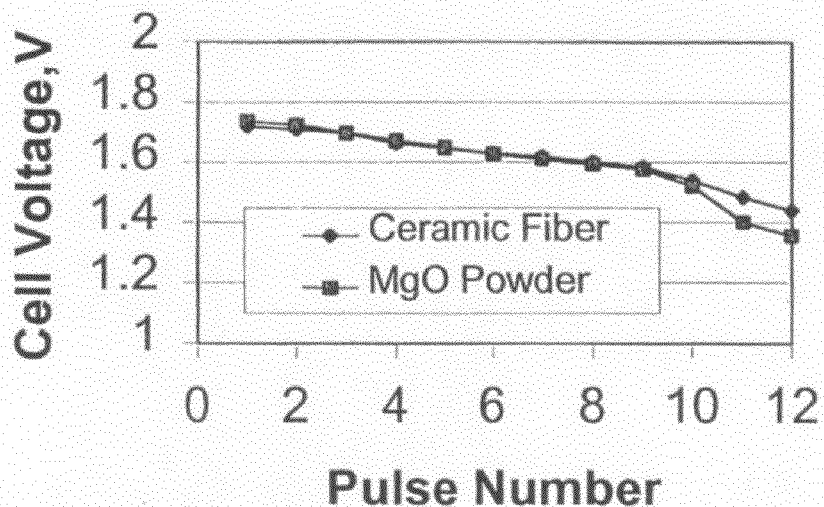
FIG. 5 is a graph comparing the final voltage of 10 second pulses at 0.9 $A/cm^2$ current density for the direct substitution of a 10 mil PCC film for a 10 mil pressed-powder MgO separator in a thermal battery.
Figure 6:
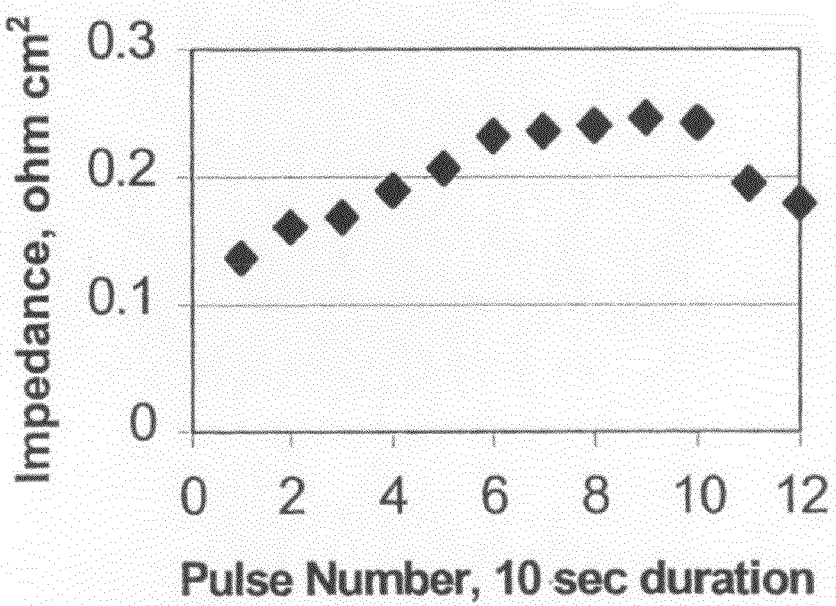
FIG. 6 is a graph illustrating the low impedance of Li—Si alloy/$CoS_2$ cell including a 10 mil PCC film separator, based on 10-sec pulses of 0.9 $A/cm^2$.

The test cell was evaluated under static thermal conditions with 10 second pulses using 0.9 A/cm$^2$ current density at 500° C., see FIG. 4. Outstanding performance of greater than 1.6 volts for the pulse voltage for the first 75% of cell capacity showed that PCC films of the invention (at less than 12 mils thickness) can meet or exceed the performance of the pressed MgO powder separators of substantially greater thickness.

EXAMPLE 3

PCC Film Laminated with Electrode Particle Bed

Figure 2:
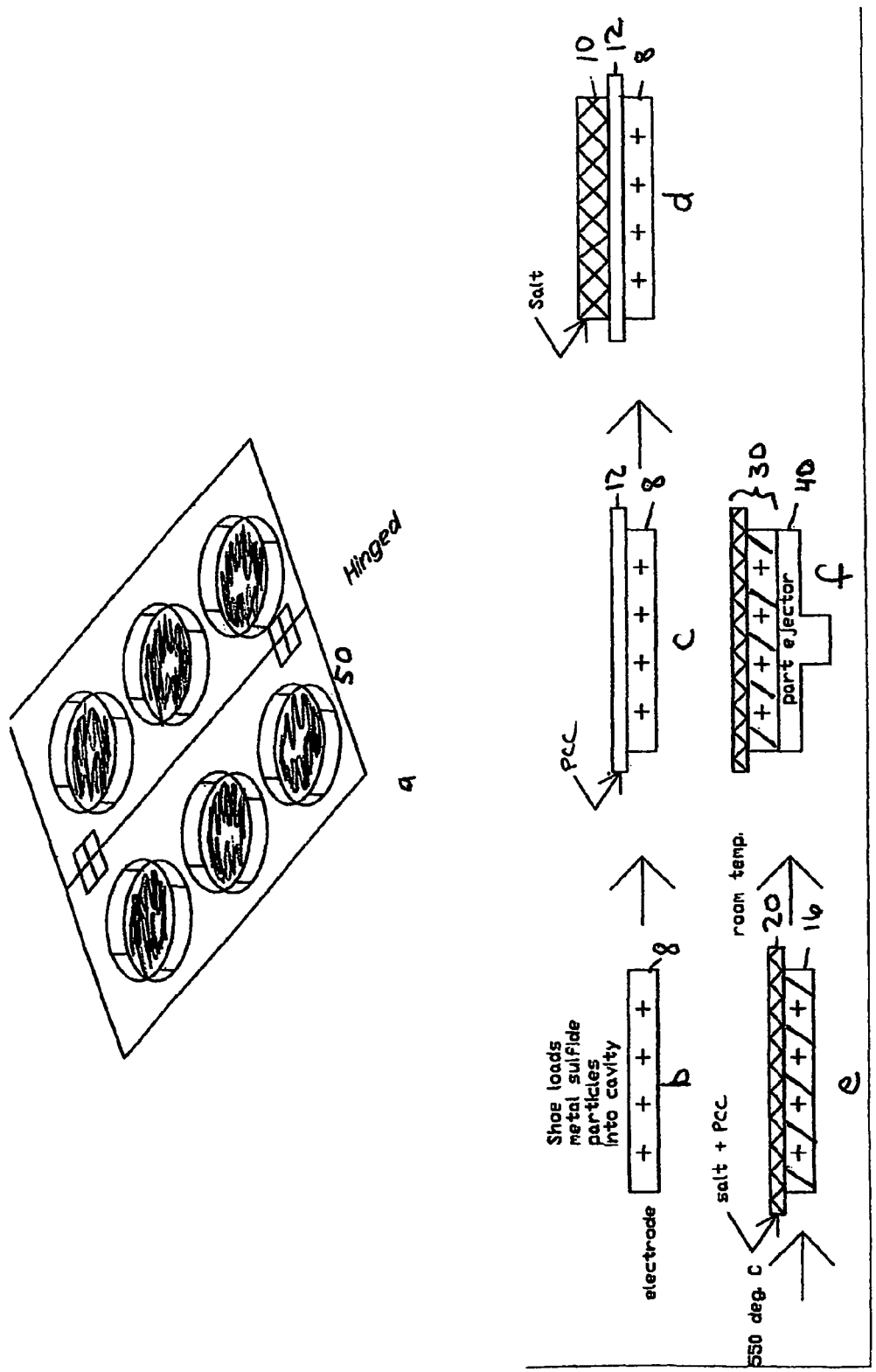
FIG. 2 depicts the conveyor belt (a) process for making a laminate cross-section b-f of a PCC film along with a metal-sulfide, particle-bed, which after electrolyte addition becomes an electrode.

A cut 250 micron thick PCC film as produced in Example 1 is positioned onto a cavity that has been filled with $FeS_2$ particles, as shown in FIG. 2. The cavity is coated with BN to eliminate sticking to the cup. In this procedure, 2.3 g of the LiCl—LiBr—KBr electrolyte mixture used in Example 2 was placed onto the PCC film—this amount of electrolyte is sufficient to infiltrate both the PCC film and electrode FeS2 electrode powder. The arrangement of materials is then passed through a 550° C. tunnel furnace. After the electrolyte melts and infiltrates the two component layers, the electrolyte-to-separator weight ratio is 87:13 and the electrolyte-to-$FeS_2$ cathode weight ratio is 25:75. The electrolyte-infiltrated PCC film becomes laminated to the $FeS_2$/electrolyte pellet via the infiltrated electrolyte salt.

EXAMPLE 4

PCC Film Laminated with a Tapecast Electrode Particle Bed

A tapecast electrode is comprised of particles held together in 2-5 volume % of a polymer matrix, which is decomposed and removed during thermal processing of the electrode. A PCC film comprising a 80:20 weight ratio of $Al_2O_3$-to-$AlSiO_2$ fiber, as formed in Example 2, is positioned onto a tapecast piece of cathode material (i.e., a powder bed of 50 volume % $FeS_2$ and $CuFeS_2$ particles in a 7:3 molar ratio, respectively) of the same size and shape and the stack is placed onto a conveyor belt that runs through a tunnel furnace. The conveyor belt is coated with BN to eliminate sticking. About 2.3 g of the LiCl—LiBr—KBr electrolyte material used in Example 2 is placed onto the PCC film, which then is passed through the tunnel furnace at a 550° C. After the electrolyte melts and infiltrates the two component layers, the electrolyte-to-separator weight ratio is 89:11 and the electrolyte-to-cathode weight ratio is 22:78. The electrolyte-infiltrated PCC film is laminated to the cathode/electrolyte pellet via the infiltrating electrolyte. The laminated PCC film/cathode component which possesses superior handling strength compared to conventional MgO-based separator material, is then stacked with Li—Si alloy/electrolyte pellet to form a thermal battery cell.

EXAMPLE 5

Third-Party Test of PCC Film

Figure 7:
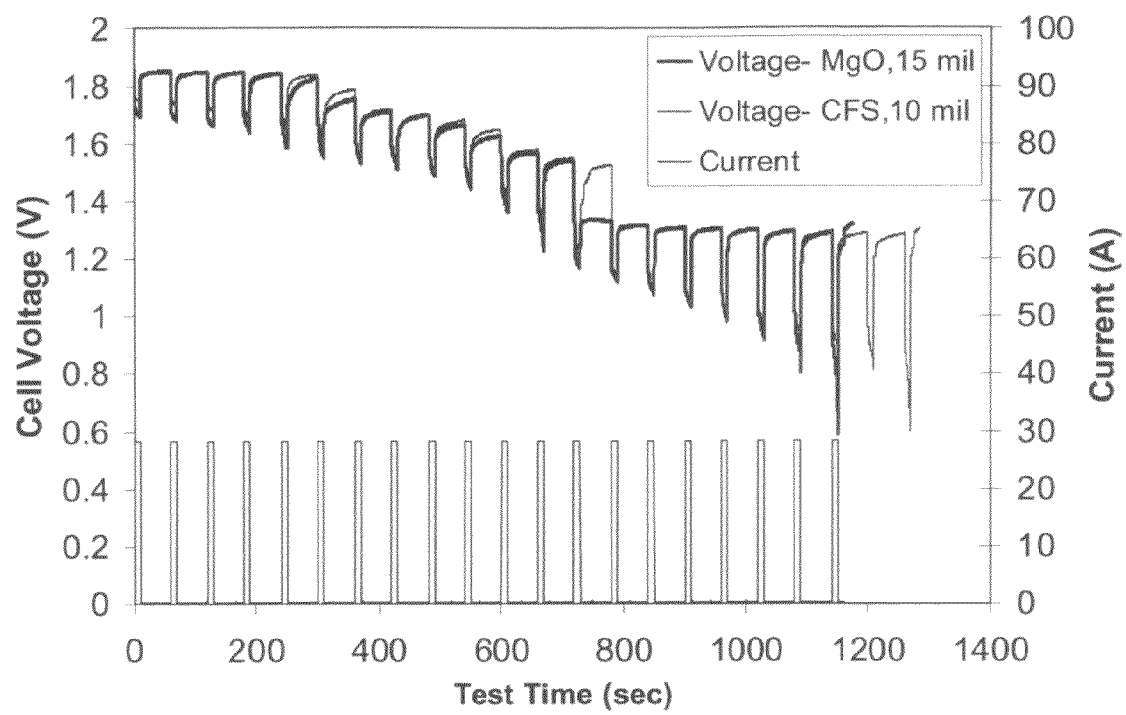
FIG. 7 is a cell voltage/time plot of a Li—Si alloy/$CoS_2$ cell including a PCC film separator compared to a cell with a MgO separator.

A 2.5 inch diameter, 10 mil thick PCC film of the invention, as prepared in Example 2 was tested at a third-party test facility in Li—Si alloy/$CoS_2$ cells, compared to cells containing a conventional 15 mil thick MgO separator. The tests used 29 Amp pulses for 10 seconds every minute (see FIG. 7, in which voltage trace 1 is for the conventional MgO-based cell, and trace 2 is for the PCC-based cell of the invention). In spite of the lower level of electrolyte present in the PCC film-based cell, the PCC cell surprisingly exhibited increased power, with a desirable 33% decrease in cell impedance for the first half of the cell's upper plateau capacity. In addition, the cell capacity significantly increased due to the use of the PCC film as a separator, as evidenced by the two additional pulses that were obtained. The lower separator weight in the PCC-based cell also allowed for the use of a lower weight heat pellet.

In summary, the PCC film materials of the present invention have the following beneficial properties: MOR of Salt-Loaded Parts (>2000 psi); Average bulk density without electrolytes (0.3 g/cm$^3$); Typical Open Volume (90-95%); Thickness range (0.003-0.25 inches); Tensile Strength (>350 g/in); and Maximum Use Temperature (about 1200° C.). Table 1 illustrates typical values for important characteristics of a PCC film of the invention compared to those of a pressed MgO powder for use as a separator in a thermal battery cell.

TABLE 1

Separator Comparison

| Characteristics | MgO Powder Pellet | Ceramic Fiber Film Separator |
| --- | --- | --- |
| Thickness | 10-25 mil | 5-10 mil |
| Cost, % of Total | ~3% | ~10% of Thin Cell Materials |
| Size Limitation | 3.5 in Diameter | Up to 10 inch Diameter achieved |
| Handling | Brittle | Flexible |
| Electrolyte Content | 70 vol. % | 85 vol. % |

Figure 8:
FIG. 8 shows a scanning electron microscopic (SEM) image of a PCC film of the invention.

The PCC films of the present invention are flexible and highly porous, while exhibiting an unexpectedly high MOR of 2000 to 4500 psi, making these materials an excellent replacement for conventional MgO separators in thermal battery applications, even at thicknesses of 5 to 10 mils. FIG. 8 shows a scanning electron microscopic (SEM) image of a PCC film of the invention, which shows the ceramic fibers coated with MgO and the MgO coating connecting the fibers together in a network. The image in FIG. 8 also clearly illustrates the open pore structure of the PCC film, which is formed by the interstices between the interconnected fibers.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term consisting of is to be construed as limiting the scope to specified materials or steps. The term consisting essentially of is to be construed as limiting the scope to specified materials or steps and those that do not affect the basic and novel characteristics of the claimed invention. Recitation of ranges of values herein are merely intended to serve as a shorthand method of referring individually to each separate value falling within the range, unless otherwise indicated herein, and each separate value is incorporated into the specification as if it were individually recited herein. Recitation of numbers values are to be interpreted as including known suitable margins of measurement error consistent with the technique exemplified as being used to determine the value. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

I claim:

1. A flexible, porous ceramic composite film comprising 50% to 95% by weight of electrically non-conductive ceramic fibers, a coating of magnesium oxide on the surface of the fibers in an amount in the range of 5% to 50% by weight of the film; wherein the ceramic fibers comprise $Al_2O_3$, $AlSiO_2$, or a mixture of the foregoing; and the magnesium oxide coating interconnects and binds the ceramic fibers together, providing a porous network of magnesium oxide-coated fibers having a porosity of not less than 50% by volume.

2. The film of claim 1, wherein the ceramic fibers are up to 10 microns in diameter and up to 1 mm in length.

3. The film of claim 1, wherein the ceramic fibers comprise 50% to 95% by weight $Al_2O_3$ and 5% to 50% by weight $AlSiO_2$.

4. The film of claim 1, wherein the porous network has a porosity in the range of 70 to 95% by volume.

5. The film of claim 1, wherein the film has a thickness of less than 12 mils.

6. The film of claim 1, wherein the film has a thickness in the range of 5 to 10 mils.

7. The film of claim 1, wherein the porous film includes pores up to 5 microns in average diameter.

8. The film of claim 1, wherein the ceramic fibers comprise 56% by weight $Al_2O_3$ and 19% by weight $AlSiO_2$ and the magnesium oxide coating is present at 25% by weight.

9. A flexible, porous ceramic composite film comprising 50% to 95% by weight of electrically non-conductive ceramic fibers, a coating of magnesium oxide on the surface of the fibers in an amount in the range of 5% to 50% by weight of the film; wherein the ceramic fibers comprise $Al_2O_3$, $AlSiO_2$, or a mixture of the foregoing; and the magnesium oxide coating interconnects and binds the ceramic fibers together, providing a porous network of magnesium oxide-coated fibers having a porosity of not less than 50% by volume; the pores of the network containing a solid electrolyte salt in an amount of up to 95% by volume based on pore volume of the network.

10. The film of claim 9, wherein $Al_2O_3$ is present in the ceramic fibers and the film has a thickness less than 12 mils.

11. The film of claim 9, wherein the electrolyte salt comprises a lithium halide salt.

12. The film of claim 9, wherein the electrolyte salt comprises a mixture of LiCl, LiBr, and KBr.

13. The film of claim 9, wherein the ceramic fibers comprise 50% to 95% by weight $Al_2O_3$ and 5% to 50% by weight $AlSiO_2$.

* * * * *